US007047485B1

(12) United States Patent
Klein et al.

(10) Patent No.: US 7,047,485 B1
(45) Date of Patent: May 16, 2006

(54) INTELLIGENT PRE-CACHING ON A NETWORK

(75) Inventors: Paul F. Klein, Thousand Oaks, CA (US); Linh Ba Chung, Simi Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 926 days.

(21) Appl. No.: 09/705,557

(22) Filed: Nov. 2, 2000

Related U.S. Application Data

(60) Provisional application No. 60/164,698, filed on Nov. 10, 1999.

(51) Int. Cl.
*G06F 17/00* (2006.01)

(52) U.S. Cl. .................................... 715/513; 715/501.1
(58) Field of Classification Search ................ 715/513, 715/501.1, 564; 711/137; 709/203, 219, 709/218, 223; 707/3
See application file for complete search history.

(56) References Cited

U.S. PATENT DOCUMENTS

| 5,802,292 | A | * | 9/1998 | Mogul .......................... 709/203 |
|---|---|---|---|---|
| 5,978,841 | A | * | 11/1999 | Berger .......................... 709/217 |
| 6,038,601 | A | * | 3/2000 | Lambert et al. ............. 709/226 |
| 6,055,569 | A | * | 4/2000 | O'Brien et al. ............. 709/223 |
| 6,067,565 | A | * | 5/2000 | Horvitz ....................... 709/218 |
| 6,226,655 | B1 | * | 5/2001 | Borman et al. ........... 715/501.1 |
| 6,314,451 | B1 | * | 11/2001 | Landsman et al. .......... 709/203 |
| 6,351,767 | B1 | * | 2/2002 | Batchelder et al. ......... 709/219 |
| 6,463,509 | B1 | * | 10/2002 | Teoman et al. ............. 711/137 |
| 6,571,234 | B1 | * | 5/2003 | Knight et al. .................. 707/3 |
| 6,710,787 | B1 | * | 3/2004 | Eves et al. ................... 715/764 |
| 6,721,780 | B1 | * | 4/2004 | Kasriel et al. .............. 709/203 |

OTHER PUBLICATIONS

Hill et al., "Involving remote users in continuous design of web content",Aug. 18-20, 1997, ACM pp137-145.*
Buford et al,"Delivery of MHEG-5 in a DAVIC ADSL network", Nov. 9-13, 1997, ACM, pp. 75-85.*

\* cited by examiner

*Primary Examiner*—William Bashore
*Assistant Examiner*—James H. Blackwell
(74) *Attorney, Agent, or Firm*—Gates & Cooper LLP

(57) ABSTRACT

A Fast method of retrieving Internet web pages based on pre-caching of web pages and their objects. Access by web browsers to these objects are faster since the objects are available in the web browser's local memory cache in advance of actually needing them. Thus, when the web browser needs these objects, no network delays are experienced due to having to get them from the web server located some distance away over the Internet. In addition, a computer efficient method is provided that allows for the statistical selection of which objects to pre-cache. This pre-caching method avoids excessive pre-caching of objects that are statistically insignificant but costly in their use of computer resources. Thus, with pre-caching only the objects most likely to be used in subsequent web browser interactions will take up the computer resources in the pre-caching process. A partial-intelligent method is also provided that allows for fast retrieval of complete web pages and their objects when statistical selection of objects can not be provided. In this method, all web page objects that makeup the web pages are pre-cached without consequence of their significance to subsequent web browser interactions. With partial-intelligent pre-caching, all web page objects have equal significance and all objects are pre-cached. Thus, making access to subsequent web pages very fast at the expense of not optimizing computer resource utilization.

54 Claims, 2 Drawing Sheets

INTELLIGENT PRE-CACHING ON A NETWORK

CROSS-REFERENCE TO RELATED APPLICATIONS

This application claims the benefit under 35 U.S.C. Section 119(e) of the following now abandoned and commonly-assigned U.S. provisional patent application(s), which is/are incorporated by reference herein:

Provisional Application Ser. No. 60/164,698, filed Nov. 10, 1999, by Paul F. Klein, entitled "INTELLIGENT PRE-CACHING ON A NETWORK."

This application is related to U.S. patent application Ser. No. 09/428,271, filed Oct. 27, 1999, now U.S. Pat. No. 6,202.036 entitled "END-TO-END RESPONSE TIME MEASUREMENT FOR COMPUTER PROGRAMS USING STARTING AND ENDING QUEUES," by Paul F. Klein et al., which is a continuation application of U.S. Pat. No. 5,991,705, issued on Nov. 23, 1999, and filed Jul. 23, 1997, entitled "END-TO-END RESPONSE TIME MEASUREMENT FOR COMPUTER PROGRAMS USING STARTING AND ENDING QUEUES," by Paul F. Klein et al., which applications are incorporated by reference herein.

This application is also related to U.S. patent application No. 09/428,262, filed Oct. 27, 1999, now U.S. Pat. No. 6,526,371, entitled "ROUND TRIP RESPONSE TIME MEASUREMENT FOR COMPUTER PROGRAMS," by Paul F. Klein et al., which application is incorporated by reference herein.

BACKGROUND OF THE INVENTION

1. Field of the Invention.

This invention relates generally to computer hardware and software, and more particularly to caching information on a network.

2. Description of the Related Art.

Information such as files, documents, pictures, sound clips, video, etc. are stored electronically on computers. To share such information among multiple computer users, a network may be utilized wherein multiple computers are connected and may communicate with each other. The Internet is a large network made up of more than 65 million computers in more than 100 countries covering commercial, academic and government endeavors. Information is disseminated across the Internet from one computer referred to as a server in the form of web pages that may be viewed using web browser applications executing on a user's computer (referred to as a client).

Web pages may be static documents consisting of hyper text markup language (HTML) tags or codes, embedded in the text. HTML defines the page layout, fonts and graphic elements as well as the hypertext links to other documents available on the network. Each link contains the uniform resource locator (URL), which provides the location or address, of a web page residing on the same server or any server worldwide. Alternatively, web pages may be created dynamically by the server or client. Such dynamic creation may be in accordance with a client's preferences or requests.

Typically, a client using a web browser requests a web page by entering or selecting a link. The request is delivered to the server at the specified location. Thereafter, the server creates the web page if necessary, and responds to the client with the static or dynamic web page. Alternatively, the request may specify an applet (a small application that executes on a client) or various objects. The server forwards the applet or objects to the client who then executes the applet or utilizes the objects to dynamically create and display the web page on the browser.

One problem with disseminating information across the Internet is the transmission rare of the information. If a client is connected to the Internet using a modem and an analog telephone line, the transmission rate depends on the speed of the modem (e.g., a 56 Kbps modern, the current top speed, or older 28.8 Kbps modems). Alternatively, faster transmission means may be utilized such as a Digital Subscriber Line (DSL), Integrated Services Digital Network (ISDN), cable modem, T1 line, etc. With any transmission means, the user must wait while the information is transmitted across the Internet. Once the information has been received, it is processed and then displayed. Accordingly, the speed with which a user may view a web page depends on the speed with which the information may be retrieved by the web browser.

To speed up the display speed of a web page, a web browser may store previously requested and viewed web pages in a browser cache on the client. A browser cache is a folder on the local client disk that holds popular web pages. The first time a web page is requested and retrieved, the page is stored in the browser cache where it can be retrieved and displayed by the browser more quickly. Thereafter, caching servers update the pages in the folder with the latest version from the Internet.

However, web pages are only stored in browser cache when a user has specifically requested and retrieved the web page from the server on a per page basis. There is no mechanism to allow web pages that are likely to be viewed in the future to be retrieved prior to the user actually requesting the web page. Consequently, although cache may expedite the time needed to display a web page, a user must first request the page and then wait to retrieve it.

SUMMARY OF THE INVENTION

One or more embodiments of the invention provide a fast: method of retrieving Internet web pages based on the intelligent pre-caching of the web pages and their objects, placing them local to a commercial web browser, when they are normally resident far away at a commercial web server. Using this pre-caching method, access by web browsers to these objects are faster due to the fact that these objects are available in the web browser's local memory cache in advance of actually needing them. Thus, when the web browser needs these objects, no network delays are experienced due to having to get them from the web server located some distance away over the Internet.

In addition, a computer efficient method is provided that allows for the statistical selection of which objects to pre-cache over another. This intelligent pre-caching method avoids excessive pre-caching of objects that are statistically insignificant but costly in their use of computer resources such as the Internet network, memory and the computer central processing unit. "Thus, with intelligent pre-caching only the objects most likely to be used in subsequent web browser interactions will take up the computer resources in the pre-caching process. This will optimize the fast retrieval of complete web pages with the least amount of computer resources being consumed.

A partial intelligent method is also provided that allows for fast retrieval of complete web pages and their objects when statistical selection of objects can not be provided. In this method, all web page objects that makeup the web pages are pre-cached without consequence of their significant to subsequent web browser interactions. With partial-intelligent pre-caching all web page objects will have equal significance and all objects will be pre-cached regardless. Thus, making access to subsequent web pages very fast at the expense of not optimizing computer resource utilization.

BRIEF DESCRIPTION OF THE DRAWINGS

Referring now to the drawings in which like numbers represent similar features throughout.

DETAILED DESCRIPTION OF THE PREFERRED EMBODIMENT

In the following description of the preferred embodiment, reference is made to the accompanying drawings, which form a part hereof, and in which is shown by way of illustration the specific embodiment in which the invention may be practiced. It is to be understood that other embodiments may be utilized and structural and functional changes may be made without departing from the scope of the present invention.

OVERVIEW

Faster access to web pages, from over the Internet, can be accomplished using an intelligent pre-caching or partial-intelligent pre-caching technique based upon the making available of web page objects, at the web browser, before they are needed.

Pre-caching takes place during the idle time that occurs when the web browser is displaying a web page and that time that occur, when a new web page is requested. An intelligent statistical technique is used to determine what the next web pages to be required are, and a technique is used to fetch these web pages from a web server, over the Internet, before they are officially requested. Hence, the needed pages are already in the web browser cache and available to the web browser immediately.

One or more embodiments of the invention provide for a method for making Internet web browsers access web pages faster by pre-caching web pages and objects, locally at the web browser, before they are actually needed. Thus, avoiding delays placed upon that web browser by the Internet network, memory or CPU.

One or more embodiments of the invention provide a method for intelligent pre-caching of web pages and their objects based on a statistical significance providing a statistical subset of objects to be available before actually needed. A statistical subset reduces the number of objects to be cached and reduces computer resource utilization as well as the utilization of the Internet.

One or more embodiments of the invention provide a method for partial-intelligent pre-caching of web pages and their objects based on a non-statistical significance without concern for computer resource utilization or utilization of the Internet.

One or more embodiments of the invention provide a method for keeping account of web pages and then object's statistical significance as part of a commercial web servers operation.

Hardware Environment

Figure 1:
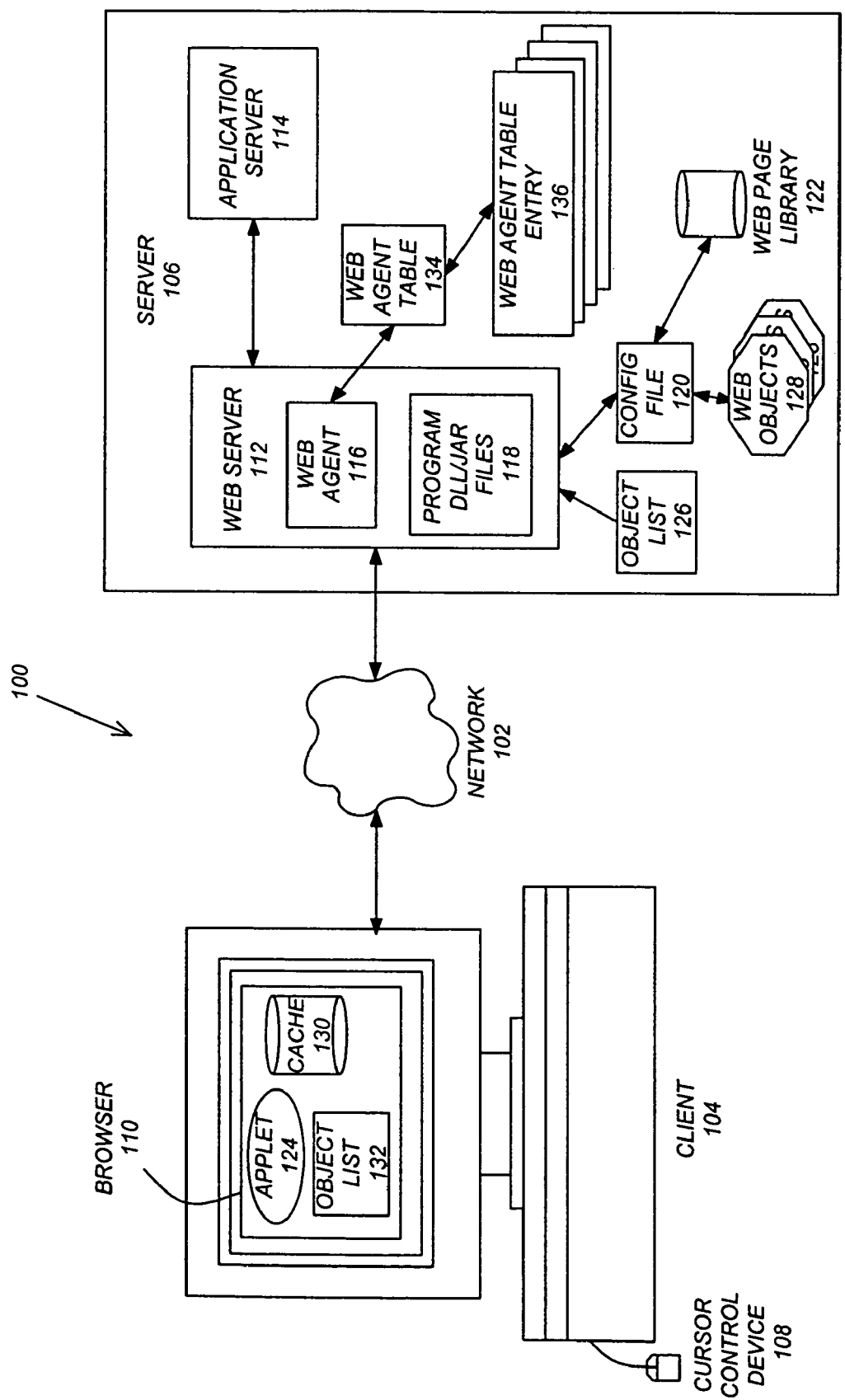
FIG. 1 illustrates an exemplary hardware and software environment that could be used to implement the preferred embodiment of the present invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 108.

In accordance with one or more embodiments of the invention, the Internet 102 connects client computers 104 executing Web browsers 110 to server computers 106 executing Web servers 112 and application servers 114. The Web browser 110 is typically a program such as NETSCAPE NAVIGATOR or MICROSOFT INTERNET EXPLORER. Further, as described below, software may be downloaded from server computer 106 to client computer 104 and installed as a plug in or ActiveX control of Web browser 110. Web Server 106 may be a web server 106 currently available in the market such as the Web Server available from Netscape, the Internet Information Server (IIS) available from Microsoft, or the Web Server available from Apache.

In one or more embodiments of the invention, web server 112 hosts an Active Server Page (ASP) or Internet Server Application Programming Interface (ISAPI) application that may be executing scripts. The scripts invoke objects that execute business logic (referred to as business objects). The business objects then manipulate data in a database. When a developer encapsulates the business functionality unto objects, the system may be referred to as a component object model (COM) system. Accordingly, tire scripts executing on web server 112 (and/or application 114) invoke COM objects that implement the business logic. Further, server 106 may utilize Microsoft's Transaction Server (MTS) to access required data stored in a database via an interface such as ADO (Active Data Objects), OLE DB (Object Linking and Embedding DataBase), or ODBC (Open Data-Base Connectivity).

The intelligent and partial-intelligent pre-caching technology is enabled by placing software agent code, Web Agent 116, into shareable directories of a commercial Web Server 106. Web Server 112 is installed, configured and verified as working on the target computer (i.e., server 106) prior to placing Web Agent 116 on Web Server 112. Web Agent 116 is activated on Web Server 112 by placing several program dynamic link libraries (DLLs) 118 into the shareable directory, accessible by permission, by commercial Web Server 112 during the execution of Web Server 112. In addition, depending on which commercial Web Server 112 is being used, the Web Server's 112 configuration file 120 maybe modified with parameters that indicate that DLLs 118 should be loaded and used as part of the normal Web Server 112 operation. Further, depending on which commercial Web Server 112 is being used, various tools may be available to define and configure DLLs 118.

Generally, these components 110–120 all comprise logic and/or data that is embodied in or retrievable from device, medium, signal, or carrier, e.g., a data storage device, a data communications device, a remote computer or device coupled to the computer via across a network or via another data communications device, etc. Moreover, this logic and/ or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Intelligent Pre-Caching Java Applet

As described above, Web Agent 116 is installed by placing DLLs 118 into a directory accessible by web server 112. Thereafter, Web Agent 116 is part of Web Server 112's operation and the intelligent pre-caching process is enabled as soon as commercial Web Server 112 becomes initialized.

Starting with an interaction at Web Browser 110 such as the click of a cursor control device 108 or mouse, <ENTER> key or other selected keyboard operation, a transaction is generated that will request a web page from Web Server 112 and possibly that of the Application Server 114 instead. The transaction is sent to Web Server 112 across network 102 which can be the Internet/Internet or any other private network). Once the transaction is at Web Server 112, a decision will be made by Web Server 112 to route the transaction to Application Server 114 for additional service, or Web Server 112 may service this transaction locally.

In either case, Web Server 112 will have returned to it, a resultant web page that was built by Web Server 112's local processing or Web Application 114's additional processing. If the web page is a product of Web Server 112's local processing, the web page may leave been retrieved from one or more web pages located in Web Server 112's Web Page Library 122. To enable intelligent pre-caching for web pages in Web Page Library 122, a special HTML tag may be added to the already existing web page defining a Java Applet program that resides as a Java archive (JAR) file 118 in the sharable directory of Web Server 112. A JAR file is a file used to distribute a Java application that contains all the resources required to install and run a Java program in a single compressed file.

In one or more embodiments, a web page may be tagged by editing pages in Web Page Library 122 using a commercial text editor. Alternatively, a web page may be tagged using Web Server 112 as a filter that dynamically tags a web page as it leaves Web Server 112 on its way to Web Browser 110 over network 102.

If a web page is a product of Application Server 114 processing, it may have been created as part of the processing of the web page, dynamically, and is referred to as a dynamic HTML web page. In this situation, Application Server 114 may need its dynamic web page construction program modified to add the HTML Java Applet tag on each web page.

Once a web page has the Java Applet tag as part of the page, the web page is transmitted to Web Browser 110 over network 102. At the Web Browser 110, Java Applet program 124 is requested via reference made by the Java Applet tag that was added to the web page. Java Applet 124 may be retrieved via a request over network 102 and transferred to Web Browser 110 via network 102 from a JAR File 118 residing in a shared directory on Web Server 112. At this point, Java Applet 124 may be executed as a program within and under the control of Web Browser 110.

Intelligent Pre-caching Technique

Once Java Applet 124 initializes, a request is made by Java Applet 124 over network 102 to Web Agent 116 running under control of Web Server 112. The nature of the request is to retrieve from Web Agent 116, statistical information that relates to which web page is most often accessed directly after the current web page being viewed at this moment in Web Browser 110. In addition to the web page most likely to be accessed next, Web Agent 116 provides an Object List 126, to Java Applet 124 of Web Page Objects 128 that is ordered in statistical significance (high to low). Objects 128 can be graphics, applets or other web page content. Java Applet 124 retrieves Object List 126 over network 102 and begins its pre-caching logic upon it.

For each Web Object 128 in Object List 126, Java Applet 124 dispatches a program thread inside Web Browser 110, a thread that runs independent and does not interfere with any other Web Browser 110 normal activity. Java Applet 124, under this program thread, makes a request for that Web Object 128 over network 102. Web Server 112 services this request and delivers to Java Applet 124, over network path 102, the requested Web Object 128. Then Java Applet 124 copies Web Object 128 into Web Browser Cache 130 where it will reside and be made available to Web Browser 110 on subsequent Web Browser 110 transactions. Thus, Web Object 128 is made available before actually needed by Web Browser 110.

The above process is repeated over and over for each Web Object 128 that is found in the ordered Object List 126 that was provided by Web Agent 116 until the objects 128 in Object List 126 are exhausted. At this point, Java Applet 124 should have filled Web Browser Cache 130 with all statistically significant Web Objects 128 that will be accessed on the next Web Browser 110 transaction. Pre-caching is most effective if all Web Objects 128 have time to be requested from Web Server 112 and copied into Web Browser Cache 130 before the next Web Browser 110 transaction begins. Thus, intelligent pre-caching of only the statistically significant Web Objects 128 speeds the time of the total pre-cache operation by avoiding the time wasting process of pre-caching Web Objects 128 that have a small chance of being accessed. And the faster the objects 128 can be pre-cached, the better the odds that an object 128 will be cached locally before the next Browser 110 transaction begins.

In one or more embodiments, to avoid not interfering with normal Web Browser 110 processing, as soon as a new web page is requested, the intelligent pre-caching process is halted immediately The immediacy is important so that the pre-caching process does not interfere with the performance of the new web page request and actually slow up that web page's accesses. Thus, terminating Web Browser 110 pre-caching thread should be done as soon as possible with thread termination programming controls.

Partial Intelligent Pre-caching Technique

In one or more embodiments, when Java Applet 124 initializes, Java Applet 124's processing is modified to examine the web page's contents. In particular, a web page is parsed by Java Applet 124 and each HTML language tag that defines a possible next web page that the web page can link to is placed into an unordered Object List 132, a list created locally by the Applet 124 at Web Browser 110. Thus, the local unordered Object List 132 contains only the names of web pages and not any other type of web object 128.

Partial pre-caching in this manner differs from the intelligent pre-caching technique above in various manners. For example, in intelligent pre-caching, Object List 126 contains names of web objects 128 such a graphics and applets. Web page names are not part of the list—only the objects 128 that it uses are. In partial intelligent pre-caching, object list 132 only contains names of web pages. The differences in object lists 126 and 132 may limit pre-caching (in the partial pre-caching model) to only those pages that are not created dynamically in HTML. Pages not created dynamically are referred to as static web pages.

For each Web Object 128, (which are web pages), in Object list 132, Java Applet 124 dispatches a program thread inside Web Browser 110, a thread that runs independent and does not interfere with any other Web Browser 110 normal activity. Java Applet 124, under this program thread, makes a request for that web page Web Object 128 over network 102. Web Server 112 services this web page request and delivers to Java Applet 124, over network 102, the retrieved web page Web Object 128. Then Java Applet 124 copies the web page Web Object 128 into Web Browser Cache 130 where it will reside and be made available to Web Browser 110 on subsequent Web Browser 110 transactions.

In one or more embodiments, Java Applet 124 parses the just pre-cached web page and locates all additional web objects 128 defined by HTML tags within the just gotten web page. Then, for each Web Object 128 found in the web page, Java Applet 124 makes an additional request over network 102 to Web Server 112 and retrieves the additional Web Object 128. The additional Web Object 128 is sent back to Web Browser 110 via network 102 and placed into Web Browser Cache 130.

This process is repeated over and over for each web page Web Object 128 that is found in local Object List 132 until the local Object List 132 is exhausted. At this point, Java Applet 124 has filled Web Browser Cache 130 with every possible next web page and their objects 128 that can be accessed from future Web Browser 110 transactions. This partial pre-caching technique speeds up Web Browser 110 access of subsequent web browser transactions.

Accounting for a Web Page Object'S Significance When Using Intelligent Pre-Caching When using intelligent pre-caching, lava Applet 124 communicates with Web Agent 116 to learn which Web Objects 128 have statistical significance. Web Agent 116 is positioned within commercial Web Server 112 as a standard web filter object. Thus, Web agent 216 has visibility to all Web Server 112 datastreams caused by Web Browsers 110 from various web browser 110 locations over the Internet 102. For each web page request seen by Web Agent 116, a Web Agent Table 134 is used to store accounting information about that request. Using the name of the web page (i.e., the URL address), that web page has its statistics kept for it each time the web page is encounter by Web Agent 116.

Accounting Technique

The name of the web page has the form of a standard URL address. An example of a URL address is shown below:
www.mycompany.com
www.mycompany.com/index.html
www.mycompany.com/education/schedules/week.html Since a Web Server 112 call contain thousands of web page objects 128 (thousands of URL names), a fast way is needed to keep statistics on each one without overtaxing Web Server 112. To do this, Web Agent 116 allocates a large memory table, Web Agent Table 134, whose size is about 500K bytes. This size can be adjusted based on the actual number of web pages located at Web Server 112. The more web pages, the larger Web Agent Table 134 becomes Initially, 500K of memory may be utilized for the Web Agent Table 134.

Hashing

In one or more embodiments, Web Agent Table 134 may be accessible using a hash function/routine. Web Agent Table 134 is divided into slots with each of the slots being the size of the current computer word (4, 8, 16, 32, 64 . . . bit). In one or more embodiments of the invention, this size is 4 bytes but other embodiments may use much larger word sizes. Once divided into slots, each slot will represent a location to find the statistics for a specific web page. The next step is to assign the actual web page name (URL) to a Web Agent Table 134 slot. This may be accomplished using a Hash routine common to computer programs. Hash routines take a character based name and convert it to a partially unique number that ranges from 0 to the maximum being the size of the Hash table divided by the computer word size. And, this number must be a multiple of the computer's word size (e.g., 0, 4, 8, 32, 64. . . 500K/4). Thus, for any URL name, a number may be generated that is an integral of the computer's wordsize that does not exceed an upper limit. However, any type of Hash function/routine may be utilized in accordance with one or more embodiments of the invention.

Once the Hash number is generated, the number is used as an offset into Web Agent Table 134 where a slot will be selected to hold statistical information about the web page. Since there is no guarantee that each unique URL address can be hashed to a unique Web Agent Table 134 slot, sharing of the slot may occur. When a URL hashes to a Web Agent Table 134 slot that is holding statistics for another URL address, this is called a Hash table collision. In one or more embodiments, collisions are handled by selecting either the next open Web Agent Table entry 136 down from the current one or allocating more memory for a Web Agent Table Entry 136. However, any other collision handling technique may be utilized in accordance with one of more embodiments of the invention.

Statistical Ordering of Web Objects with a Web Agent Table Entry

Each Web Object 128 has an associated referencing web page name (URL). The web page name is hashed into Web Agent Table 134 and the slot that keeps its information is located. This slot points to a portion of memory that contains Web Agent Table Entry 136, which holds the web page statistical information.

The current web page has associated with it a referring web page—referring pages indicate what page the current page came from. The referring Web Page Agent Table Entry 136 is located (via hashing) and updated to reflect that this current web page came from it. Based on the number of times this current page has been accessed by all Web Browsers 110, its referring Web Agent Table Entry 136 has its corresponding counts adjusted and its content ordered by most linked nest pages to least linked web pages. The names of each Web Object 128, in the current web page are maintained as part of referring Web Agent Table Entry, 136's as well. When completed, Web Server 112 contains a relationship between each of its web pages and the statistical pages accessed next—ordered by pages and their Web Objects 128. For example: Web Page (A) links to Web Page (C) 80% of the time, Web Page (B) 10% and Web Page (D) 10% Thus, if the current page is (A), then pre-caching the Web Objects 128 from (C) before (B or A) makes the most sense. And this statistical relationship is constantly updated with each web page request that Web Server 112 processes.

Each time Java Applet 124 requests an Object list 126 from Web Agent 116, a subset of the Web Agent Table Entry 136 is returned. Web Agent 116 takes the name of Java Applet 124's web page, which is a URL address, and hashes it into Web Agent Table 134 and resolves to Web Agent "fable Entry 136. A copy is made of this entry 136 and the Java Applet 124 processes this as part of intelligent pre-caching.

Program Flow

Figure 2:
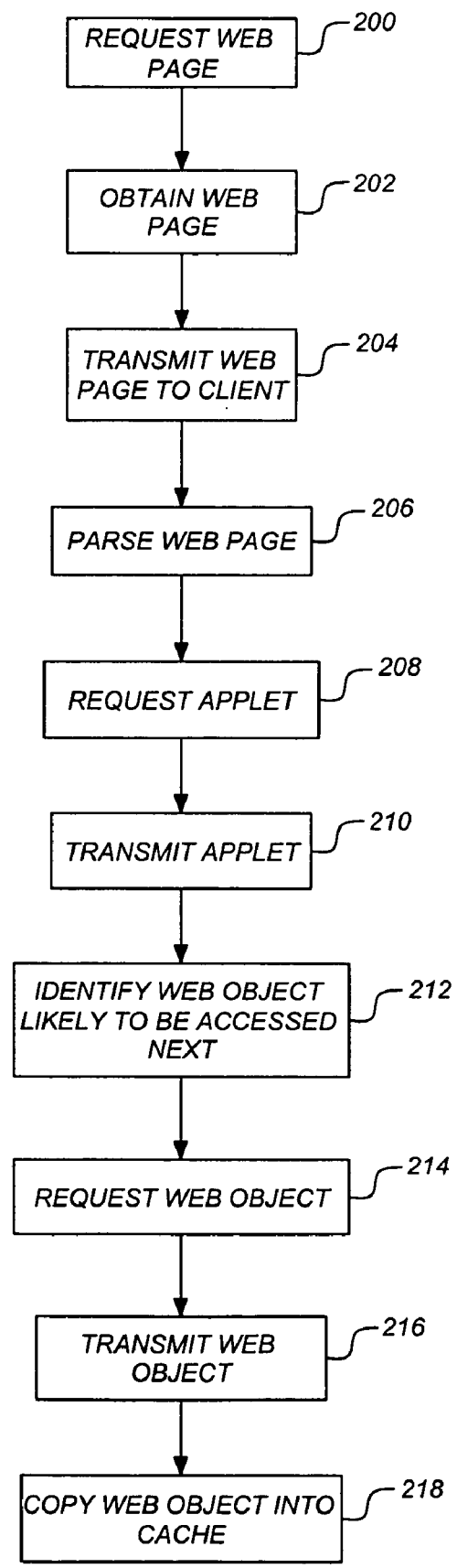
FIG. 2 is a flow chart illustrating intelligent pre-caching in accordance with one or more embodiments of the invention.

FIG. 2 is a flow chart illustrating intelligent pre-caching in accordance with one or more embodiments of the invention. At step 200, a web page is requested by client 104. At step 202, server 106 obtains the requested web page. As described above, obtaining the web page may include inserting an applet tag that identifies the applet used by the invention. At step 204, the web page is transmitted to client 104. Browser 110 parses the web page at step 206. The parsing identifies the applet tag inserted by server 106. At step 208, the applet 124 identified by the applet tag is requested from the server 106. At step 210, the applet 124 is transmitted from the server 106 to the client 104. Browser 110 then begins execution of the applet 124.

At step 212, the web object that is likely to be accessed next is identified. Such identification may be conducted by the applet 124 parsing the web page to obtain relevant links. Alternatively, as described above, server 106 may maintain statistics for accessed web objects. If server 106 maintains the statistics, the server 106 transmits a list 126 of web objects 128 to the applet 124. The list 126 contains those web objects 128 likely to be accessed nest and may be sorted based on the statistics collected. Applet 124 requests each of the web objects 128 on the list 126 until all of the objects 128 have been retrieved at steps 214 and 216. At step 218, applet 124 copies the received web objects 128 into the browser's cache 130.

By executing steps 200–218, web objects are pre-cached into the web browser 110 cache 130 prior to a user actually requesting the web object/web page. Further, in one or more embodiments of the invention, the applet 124 is configured to halt all pre-caching for any normal operation of web browser 110. Thus, the pre-caching operations are executing in the background of browser 110. Thus, such pre-caching may only begin to execute after a designated time period or period of inactivity.

CONCLUSION

In summary, the present invention provides a method, apparatus, and article of manufacture for pre-caching information in a network environment.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for caching information in a browser comprising:
    (a) requesting a first web page;
    (b) receiving the first web page in a browser in response to the request, wherein the first web page comprises an applet tag;
    (c) requesting an applet identified by the applet tag;
    (d) receiving the applet;
    (e) executing the applet, wherein the applet is configured to:
        (1) obtain an object list that identifies one or more web objects likely to be accessed next as part of one or more additional web pages that are likely to be requested by a user;
        (2) request one or more web objects identified in the object list;
        (3) receive the one or more requested web objects;
        (4) precache the one or more requested web objects by copying the one or more requested web objects into a cache of the browser;
    (f) receiving a request from the user for a second web page;
    (g) retrieving the web object from the cache for the second web page in response to the request from the user; and
    (h) displaying the retrieved web object, as part of the second web page, in the browser.

2. The method of claim 1 wherein the one or more web objects is a hypertext markup language (HTML) document.

3. The method of claim 1 wherein the one or more web objects in the object list are ordered by statistical significance and the applet requests each web object in the list in the statistical significance order.

4. The method of claim 1 wherein the request for one or more web objects comprises a request for statistical information regarding the additional web pages most likely to be accessed directly after the current web page being viewed on the browser and wherein only one or more statistically significant web objects are received by the applet.

5. The method of claim 1 wherein the applet is further configured to:
    parse contents of the web page; and
    create the web object list, wherein the web object list contains each link to another web page that is identified from the parsing.

6. The method of claim 5 wherein, upon receiving one or more web objects requested from the web object list, the applet is further configured to:
    parse contents of the web object received;
    identify any link to another web page; and
    add the identified link to the web object list.

7. The method of claim 1 wherein the applet does not interfere with normal processing of the browser.

8. A method for caching information comprising:
    (a) receiving a request for a first web page in a server;
    (b) obtaining the first web page comprising an applet tag;
    (c) transmitting the first web page to a client;
    (d) receiving a request, in the server, for an applet identified by the applet tag;
    (e) transmitting the applet to the client, wherein the applet is configured to:
        (1) obtain an object list that identifies one or more web objects likely to be accessed next as part of one or more additional web pages that are likely to be requested by a user;
        (2) request, from the server, one or more web objects identified in the object list;

(3) precache the one or more requested web objects by copying the one or more requested web objects into a cache of a browser on the client;
(f) transmitting the requested web object to the client; and
(g) wherein the client is configured to:
   (1) receive a request from the user for a second web page;
   (2) retrieve the web object from the cache for the second web page in response to the request from the user; and
   (3) display the retrieved web object, as part of the second web page, in the browser.

9. The method of claim 8 wherein the obtaining of the first web page comprises retrieving a static web page from a web page library on the server.

10. The method of claim 9 further comprising adding an applet tag to the static web page.

11. The method of claim 8 wherein the obtaining of the first web page comprises using a filter that dynamically tags the first web page as the first web page is being transmitted to the client.

12. The method of claim 8 wherein the obtaining of the first web page comprises dynamically creating the first web page.

13. The method of claim 8 further comprising transmitting the web object list to the client.

14. The method of claim 8 further comprising maintaining access statistics for the first web page, wherein the access statistics are statistics for web objects accessed after the first web page.

15. The method of claim 14 wherein the maintaining comprises maintaining a web agent table with slots, wherein each slot represents a location to find the access statistics for a web page.

16. The method of claim 15 wherein a hash function performed on a uniform resource locator (URL) for a web page identifies the slot containing the access statistics for that web page.

17. The method of claim 15 wherein the access statistics in each slot are ordered by most linked to web objects to least linked to web objects.

18. The method of claim 17 further comprising transmitting a subset of the slot for the requested web page to the applet.

19. A system for caching information comprising:
(a) a client;
(b) an application on the client, the application configured to:
   (1) request a first web page;
   (2) receive the first web page in a browser in response to the request, wherein the first web page comprises an applet tag;
   (3) request an applet identified by the applet tag;
   (4) receive the applet;
   (5) execute the applet, wherein the applet is configured to:
      (i) obtain an object list that identifies one or more web objects likely to be accessed next as part of one or more additional web pages that are likely to be requested by a user;
      (ii) request one or more web objects identified in the object list;
      (iii) receive the one or more requested web objects;
      (iv) precache the one or more requested web objects by copying the one or more requested web objects into a cache of the browser;
   (6) receive a request from the user for a second web page;
   (7) retrieve the web object from the cache for the second web page in response to the request from the user; and
   (8) display the retrieved web object, as part of the second web page, in the browser.

20. The system of claim 19 wherein one or more of the web objects is a hypertext markup language (HTML) document.

21. The system of claim 19 wherein the one or more web objects in the object list are ordered by statistical significance and the applet requests each web object in the list in the statistical significance order.

22. The system of claim 19 wherein the request for one or more web objects comprises a request for statistical information regarding the additional web pages most likely to be accessed directly after the current web page being viewed on the browser and wherein only one or more statistically significant web objects are received by the applet.

23. The system of claim 19 wherein the applet is further configured to:
   parse contents of the first web page; and
   create the web object list, wherein the web object list contains each link to another web page that is identified from the parsing.

24. The system of claim 23 wherein upon receiving a web object requested from the web object list, the applet is further configured to:
   parse contents of the web object received;
   identify any link to another web page; and
   add the identified link to the web object list.

25. The system of claim 19 wherein the applet does not interfere with normal processing of the browser.

26. A system for caching information comprising:
(a) a server;
(b) an application on the server, the application configured to:
   (1) receive a request for a first web page;
   (2) obtain the first web page comprising an applet tag;
   (3) transmit the first web page to a client;
   (4) receive a request for an applet identified by the applet tag;
   (5) transmit the applet to the client, wherein the applet is configured to:
      (i) obtain an object list that identifies one or more web objects likely to be accessed next as part of one or more additional web pages that are likely to be requested by a user;
      (ii) request, from the server, one or more web objects identified in the object list; and
      (iii) precache the one or more requested web objects by copying the one or more requested web objects into a cache of a browser on the client;
   (6) transmit the requested web object to the client
(c) wherein the client is configured to:
   (1) receive a request from the user for a second web page;
   (2) retrieve the web object from the cache for the second web page in response to the request from the user; and
   (3) display the retrieved web object, as part of the second web page, in the browser.

27. The system of claim 26 wherein the server is configured to obtain the first web page by retrieving a static web page from a web page library on the server.

28. The system of claim 27 further comprising adding an applet tag to the static web page.

29. The system of claim 26 wherein the server is configured to obtain the first web page by using a filter that dynamically tags the first web page as the first web page is being transmitted to the client.

30. The system of claim 26 wherein the server is configured to obtain the first web page by dynamically creating the first web page.

31. The system of claim 26 wherein the server is further configured to transmit the web object list to the client.

32. The system of claim 26 wherein the server is further configured to maintain access statistics for the first web page, wherein the access statistics are statistics for web objects accessed after the first web page.

33. The system of claim 32 wherein the server is configured to maintain by maintaining a web agent table with slots, wherein each slot represents a location to find the access statistics for a web page.

34. The system of claim 33 wherein a hash function performed on a uniform resource locator (URL) for a web page identifies the slot containing the access statistics for that web page.

35. The system of claim 33, wherein the access statistics in each slot are ordered by most linked to web objects to least linked to web objects.

36. The system of claim 35 further comprising transmitting a subset of the slot for the requested first web page to the applet.

37. An article of manufacture comprising a program storage medium readable by a computer and embodying one or more instructions executable by the computer to perform a method for caching information, the method comprising:
    (a) requesting a first web page;
    (b) receiving the first web page in a browser in response to the request, wherein the first web page comprises an applet tag;
    (c) requesting an applet identified by the applet tag;
    (d) receiving the applet;
    (e) executing the applet, wherein the applet is configured to:
        (1) obtain an object list that identifies one or more web objects likely to be accessed next as part of one or more additional web pages that are likely to be requested by a user;
        (2) request one or more web objects identified in the object list;
        (2) receive the one or more requested web objects;
        (3) precache the one or more requested web objects by copying the one or more requested web objects into a cache of the browser;
    (f) receiving a request from the user for a second web page;
    (g) retrieving the web object from the cache for the second web page in response to the request from the user; and
    (h) displaying the retrieved web object, as part of the second web page, in the browser.

38. The article of manufacture of claim 37 wherein one or more of the web objects is a hypertext markup language (HTML) document.

39. The article of manufacture of claim 37 wherein the one or more web objects in the object list are ordered by statistical significance and the applet requests each web object in the list in the statistical significance order.

40. The article of manufacture of claim 37 wherein the request for one or more web objects composes a request for statistical information regarding the one or more additional web pages most likely to be accessed directly after the current web page being viewed on the browser and wherein only a statistically significant web object is received by the applet.

41. The article of manufacture of claim 37 wherein the applet is further configured to:
    parse contents of the first web page; and
    create the web object list, wherein the web object list contains each link to another web page that is identified from the parsing, wherein each web object requested by the applet is a web object from the web object list.

42. The article of manufacture of claim 41 wherein upon receiving a web object requested from the web object list, the applet is further configured to:
    parse contents of the web object received;
    identify any link to another web page; and
    add the identified link to the web object list.

43. The article of manufacture of claim 42 wherein the applet does not interfere with normal processing of the browser.

44. An article of manufacture comprising a program storage medium readable by a computer and embodying one or more instructions executable by the computer to perform a method for caching information, the method comprising:
    (a) receiving a request for a first web page in a server;
    (b) obtaining the first web page comprising an applet tag;
    (c) transmitting the first web page to a client;
    (d) receiving a request, in the server, for an applet identified by the applet tag;
    (e) transmitting the applet to the client, wherein the applet is configured to:
        (1) obtain an object list that identifies one or more web objects likely to be accessed next as part of one or more additional web pages that are likely to be requested by a user;
        (2) request, from the server, one or more web objects identified in the object list;
        (3) precache the one or more requested web objects by copying the one or more requested web objects into a cache of a browser on the client;
    (f) transmitting the requested web object to the client and
    (g) wherein the client is configured to:
        (1) receive a request from the user for a second web page;
        (2) retrieve the web object from the cache for the second web page in response to the request from the user; and
        (3) display the retrieved web object, as part of the second web page, in the browser.

45. The article of manufacture of claim 44 wherein the obtaining the first web page comprises retrieving a static web page from a web page library on the server.

46. The article of manufacture of claim 45, the method further comprising adding an applet tag to the static web page.

47. The article of manufacture of claim 44 wherein the obtaining the first web page comprises using a filter that dynamically tags the first web page as the first web page is being transmitted to the client.

48. The article of manufacture of claim 44 wherein the obtaining the first web page comprises dynamically creating the first web page.

49. The article of manufacture of claim 44, the method further comprising transmitting the web object list to the client.

50. The article of manufacture of claim 44, the method further comprising maintaining access statistics for the first web page, wherein the access statistics are statistics for web objects accessed after the first web page.

51. The article of manufacture of claim 50 wherein the maintaining comprises maintaining a web agent table with slots, wherein each slot represents a location to find the access statistics for a web page.

52. The article of manufacture of claim 51 wherein a hash function performed on a uniform resource locator (URL) for a web page identifies the slot containing the access statistics for that web page.

53. The article of manufacture of claim 51 wherein the access statistics in each slot are ordered by most linked to web objects to least linked to web objects.

54. The article of manufacture of claim 53, the method further comprising transmitting a subset of the slot for the requested web page to the applet.

* * * * *